United States Patent
Kempf et al.

(10) Patent No.: US 11,637,688 B2
(45) Date of Patent: Apr. 25, 2023

(54) METHOD AND APPARATUS FOR IMPLEMENTING A DISTRIBUTED BLOCKCHAIN TRANSACTION PROCESSING ELEMENT IN A DATACENTER

(71) Applicant: Telefonaktiebolaget LM Ericsson (publ), Stockholm (SE)

(72) Inventors: James Kempf, Mountain View, CA (US); Heikki Mahkonen, San Jose, CA (US); Zoltán Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

(21) Appl. No.: 16/965,927

(22) PCT Filed: Jun. 30, 2018

(86) PCT No.: PCT/IB2018/054877
§ 371 (c)(1),
(2) Date: Jul. 29, 2020

(87) PCT Pub. No.: WO2020/002974
PCT Pub. Date: Jan. 2, 2020

(65) Prior Publication Data
US 2021/0050989 A1 Feb. 18, 2021

(51) Int. Cl.
*H04L 9/06* (2006.01)
*H04L 9/00* (2022.01)
*H04L 9/32* (2006.01)

(52) U.S. Cl.
CPC ............. *H04L 9/0618* (2013.01); *H04L 9/50* (2022.05)

(58) Field of Classification Search
CPC .. H04L 9/0618; H04L 9/3236; H04L 2209/38
See application file for complete search history.

(56) References Cited

U.S. PATENT DOCUMENTS 11,063,745 B1 * 7/2021 Du ..................... H04L 9/0825
2017/0353309 A1 * 12/2017 Gray .................... G06F 21/51
(Continued)

OTHER PUBLICATIONS

Blockchain-Based Smart Contracts: A Systematic Mapping Study, published 2017, by Moorsei et al., (Year: 2017).*
(Continued)

*Primary Examiner* — Vu V Tran
(74) *Attorney, Agent, or Firm* — Nicholson De Vos Webster & Elliott LLP

(57) ABSTRACT

Methods and systems for implementing a distributed blockchain transaction processing element in a data center are described. A call to a function is received. The call for the function is dispatched to a first runtime environment of a first server. Code is fetched from the blockchain database. The code is executed in the first runtime environment resulting in a blockchain transaction. A copy of the blockchain transaction is written in a storage medium that is locally accessible by the first server. The blockchain transaction is added to a first block. A consensus mechanism is used to determine whether the first block is to be added to the blockchain database; and responsive to determining that the first block is to be added to the blockchain database, the first block is caused to be stored in a persistent storage as part of the blockchain database.

17 Claims, 6 Drawing Sheets

(56) References Cited

U.S. PATENT DOCUMENTS

| | | | |
|---|---|---|---|
| 2018/0101848 A1 | 4/2018 | Castagna et al. | |
| 2018/0268152 A1* | 9/2018 | Cuomo | G06F 16/2255 |
| 2018/0349893 A1* | 12/2018 | Tsai | G06Q 20/3821 |
| 2020/0007544 A1* | 1/2020 | Wang | H04L 9/3247 |

OTHER PUBLICATIONS

JP Morgan, "Quorum: Ethereum for Enterprise Applications", Oct. 16, 2017, 10 pages.

JP Morgan, "What is Quorum?", Advancing Blockchain Technology, Available Online at <https://www.jpmorgan.com/global/Quorum>, 2018, 11 pages.

Nayak et al., "Saranyu: Using Smart Contracts and Blockchain for Cloud Tenant Management", 2018 IEEE 11th International Conference on Cloud Computing (CLOUD), 2018, 8 pages.

Németh et al., "DAL: A Locality-Optimizing Distributed Shared Memory System", 9th USENIX Workshop on Hot Topics in Cloud Computing (HotCloud '17), Available Online at <https://www.usenix.org/conference/hotcloud17/program/presentation/nemeth>, Jul. 10, 2017, 26 pages.

Ongaro et al., "In Search of an Understandable Consensus Algorithm", Proceedings of USENIX ATC '14: 2014 USENIX Annual Technical Conference, Jun. 19-20, 2014, pp. 305-319.

WEB3.JS, "Docs—web3.eth", Available Online at < https://web3js.readthedocs.io/en/1.0/web3-eth.html>, 2016, 35 pages.

Wikipedia, "Merkle Tree", Available Online at <https://en.wikipedia.org/wiki/Merkle_tree>, May 15, 2018, 4 pages.

Wood, Gavin, "Ethereum: A Secure Decentralised Generalised Transaction Ledger Byzantium Version", Ethereum project yellow paper, Jun. 5, 2018, pp. 1-39.

Xu et al., "The Blockchain as a Software Connector", 2016 13th Working IEEE/IFIP Conference on Software Architecture (WICSA), 2016, 10 pages.

\* cited by examiner

US 11,637,688 B2

METHOD AND APPARATUS FOR IMPLEMENTING A DISTRIBUTED BLOCKCHAIN TRANSACTION PROCESSING ELEMENT IN A DATACENTER

CROSS-REFERENCE TO RELATED APPLICATIONS

This application is a National stage of International Application No. PCT/IB2018/054877, filed Jun. 30, 2018, which is hereby incorporated by reference.

TECHNICAL FIELD

Embodiments of the invention relate to the field of cloud computing; and more specifically, to the implementation of a distributed blockchain transaction processing element in data center.

BACKGROUND ART

A blockchain system is a platform used for building, running, and deploying a distributed ledger. The distributed ledger permanently records, in a verifiable way, digital records of transactions that occur between two parties. The distributed ledger is maintained without a central authority or implementation. The distributed ledger is referred to as a blockchain that includes blocks, which are linked and secured using cryptographic mechanisms.

Typical implementations of blockchain systems include a collection of components that perform different tasks. Each component of a blockchain system may perform a different task and is operative to communicate and collaborate with the other components of the system. An exemplary implementation of a blockchain node includes a validation component, a Representational State Transfer (REST) Application Programming Interface (API) component, a transaction processing element. In this exemplary implementation, a validation component is operative to manage the data structures in the blockchain and to run a consensus mechanism with validation component of other blockchain systems before including any blocks to the blockchain database. The REST API component handles language independent operations from other blockchain components such as the transaction processing element and from client applications interacting with the blockchain node. The transaction processing element handles interactions between the blockchain system and client devices. For example, the transaction processing system may enforce certain format restrictions on the client interactions, or if the blockchain system supports smart contracts, the transaction processing element may run the language runtime system for the smart contract.

Today, the architecture of existing blockchain systems is based on a transaction processing element running on a single server of a data center for maintaining the interface between incoming transactions on the blockchain network and the persistent storage where the committed transaction is stored. Transaction processing elements of multiple blockchain systems running on individual servers communicate via the Internet Protocol (IP), and run a consensus algorithm to determine the state to be committed to the persistent storage. This architecture of a blockchain system works well for a peer-to-peer distributed system in which the individual servers hosting the transaction processing elements are distributed on a wide area network (WAN).

When the blockchain systems are permissioned and run entirely inside a single datacenter with the transaction processing elements running as individual IP nodes on servers, the communication between the servers limits the ability of the transaction processing elements to perform transactions in parallel. This greatly limits the performance of transaction processing elements and the blockchain system.

SUMMARY

One general aspect includes a method in a data center for implementing a blockchain transaction processing component, the method including: receiving, at a first server of the data center, a call to a function to be performed for a smart contract of a blockchain database; dispatching the call for the function to a first runtime environment of the first server; fetching code from the blockchain database, where the code includes a set of one or more instructions to be executed for implementing the function; executing the code in the first runtime environment resulting in a blockchain transaction and a modified state of the blockchain database; writing a copy of the blockchain transaction and the modified state of the blockchain database in a storage medium that is locally accessible by the first server, where the storage medium is part of a distributed cluster of storage media accessible to a plurality of servers of the data center; adding the blockchain transaction to a first block; determining, based on a consensus mechanism, whether the first block is to be added to the blockchain database; and responsive to determining that the first block is to be added to the blockchain database, causing the first block to be stored in a persistent storage as part of the blockchain database.

One general aspect includes a data center for implementing a blockchain transaction processing component, the data center including: a first server including: a non-transitory computer readable medium to store instructions; and a processor coupled with the non-transitory computer readable storage medium to process the stored instructions to receive a call to a function to be performed for a smart contract of a blockchain database; dispatch the call for the function to a first runtime environment of the first server; fetch code from the blockchain database, where the code includes a set of one or more instructions to be executed for implementing the function; execute the code in the first runtime environment resulting in a blockchain transaction and a modified state of the blockchain database; write a copy of the blockchain transaction and the modified state of the blockchain database in a storage medium that is locally accessible by the first server, where the storage medium is part of a distributed cluster of storage media accessible to a plurality of servers of the data center; add the blockchain transaction to a first block; determine, based on a consensus mechanism, whether the first block is to be added to the blockchain database; and responsive to determining that the first block is to be added to the blockchain database, cause the first block to be stored in a persistent storage as part of the blockchain database.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
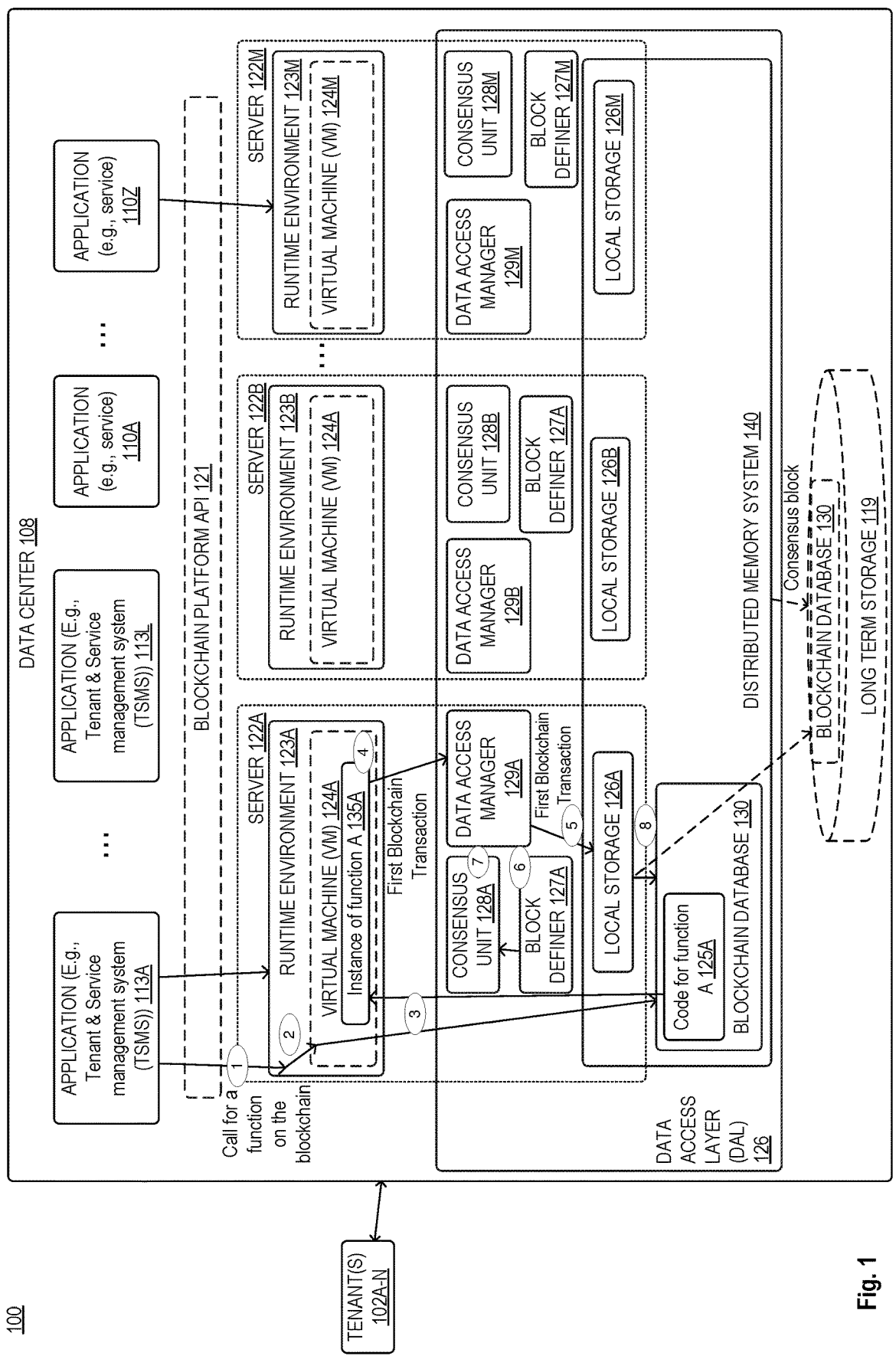
FIG. 1 illustrates a block diagram of an exemplary cloud computing system in which a distributed transaction processing element of a blockchain system is implemented, in accordance with some embodiments.

The following description describes methods and apparatus for enabling dynamic discovery of blockchain components. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Cloud computing systems are evolving to a "Function as a Service" (FaaS) infrastructure, where applications can run functions in a runtime environment that is managed by the data center. FaaS-based cloud computing system provide a platform that enables users to develop, run, and manage application functionalities without the complexity of building and maintaining the infrastructure typically associated with developing and launching an application. While Platform as a service (PaaS) platforms can be compared to FaaS platforms, PaaS platforms are different in their implementation architecture, which has some implications for scaling. In most PaaS platforms, the system continually runs at least one server process and, even with auto scaling, a number of longer running processes are simply added or removed on the same machine. In a PaaS platform there is typically an application thread which keeps running for a long period of time and handles multiple requests. This means that scalability becomes a significant problem that is more challenging to address. In contrast, in a FaaS platform, the functions are expected to start within milliseconds in order to allow handling of individual requests. There is no need for processes to continuously run while waiting for requests to occur. In FaaS platforms the applications only incur the cost of the execution context (the runtime environment) when a function is running whilst PaaS services charge per running time of the thread in which the server application is running. Further in FaaS dispatch to the function is extremely fast when compared with the dispatch of an entire process in PaaS platforms. Most existing FaaS systems are limited by the lack of ability for the functions to access persistent storage or the network while they are running.

The methods and systems described herein present an architecture for implementing a blockchain transaction processing element as a function as a service. A call to a function of the transaction processing element result in the function being run as a service. The transaction resulting from the execution of the function, if any, is transmitted to a distributed memory system that is shared within the data center by multiple servers. The shared memory system runs a consensus mechanism to complete recordation of the transaction in a blockchain database.

In some embodiments, methods and systems for implementing a blockchain transaction processing element in a data center are described. A first server of the data center receives a call to a function to be performed for a smart contract of a blockchain database. The first server dispatches the call for the function to a first runtime environment of the first server. Code is fetched from the blockchain database, where the code includes a set of one or more instructions to be executed for implementing the function. The code is executed in the first runtime environment to obtain a blockchain transaction and a modified state of the blockchain database. A copy of the blockchain transaction is written in a storage medium that is locally accessible by the first server, wherein the storage medium is part of a distributed cluster of storage media accessible to a plurality of servers of the data center. The blockchain transaction is added to a first block. A consensus mechanism is used to determine whether the first block is to be added to the blockchain database; and responsive to determining that the first block is to be added to the blockchain database, the first block is caused to be stored in a persistent storage as part of the blockchain database.

The embodiments of the present invention greatly improve the performance of the transaction processing element in a blockchain system. Transactions can be committed to the blockchain database very efficiently. For example, in some embodiments, the transactions are likely to commit to the blockchain database in less than a millisecond. In addition, the embodiments of the present invention improve the capacity of the system to perform transactions. For example, separate and unrelated invocations of a function can be executed in parallel. Several instances of a function can be executed in one or more runtime environment over one or multiple servers of the data center. The execution capacity in the blockchain system is limited only by the number of servers dedicated to the FaaS runtime environment. The availability and resiliency of the service offered by the blockchain system is improved as there is no interruptions due to a server hosting the transaction processing element going offline.

In some embodiments, to enable high availability and resiliency in the permissioned blockchain system, redundancy mechanism, such as hot/cold standby or master/slave mechanisms and replication compute state(s) can be used.

FIG. 1 illustrates a block diagram of an exemplary data center 108 for enabling implementation of a distributed blockchain transaction processing element, in accordance with some embodiments. The exemplary cloud-based architecture includes a data center 108 disposed in a cloud operator network that may be configured to offer a variety of resources and services to multiple tenants (i.e., multi-tenancy) pursuant to suitable service level agreements, service management contracts, and so on.

The data center 108 includes a set of one or more applications 113A-L and 110A-Z. Each one of the application 112A-L includes an element for managing the data center 108, the services, the tenants and or a combination of those. For example, one or more of the applications 112A-L may include a tenant and service management system (TSMS) that is operative to manage accounts and access to services hosted in the data center 108. In some embodiments, the TSMS is operative to enable the tenants 102A-N and/or the services 110A-Z to enroll/register, request and obtain access to one or more of the services 110A-MZ and track usage of these services by the tenants and/or the services. In some embodiments, the TSMS may be built on an open source distributed ledger and smart contract platform. The service TSMS may function as a Decentralized Application (DApp). It accesses the blockchain database 130 and interacts with smart delegation contract objects stored in the blockchain database.

A tenant, for the purposes of the present disclosure, may be understood as a person, organization, a service that is hosted on the data center 108, business entity, or a group of users, that desires to enroll with the cloud operator or provider for accessing a specific set of resources/services under particular authentication/authorization credentials, privileges, constraints, and/or policy-based business rules.

By way of illustration, a plurality of tenant entities 102A to 102N exemplified in FIG. 1 may comprise corporate, commercial or governmental organizations, a private person or a group of persons, that may request and consume one or more services 110A-Z hosted by the cloud-based data center 108 via one or more electronic devices in tenant premises disposed in tethered (wired) or untethered (wireless) network environments. Each of the tenant 102A-N may have one or more users that can, using an electronic device in a tenant premise, request and access one or more services of the data center 108. The users can be employees of an organization, a private individual, customers of an organization, etc. Each user can have a different level of access rights for accessing one or more of the services 110A-Z. In some embodiments, tenants and services are represented in the data center 108 via contract accounts. The accounts are recorded by a tenant and service management system (TSMS) (e.g., application 113A) in the blockchain database 130 through a blockchain platform. For tenants, each account may specify the identity of the tenant (e.g., with unique identification of the tenant (e.g., the tenant's public key and contact information such as an email address, a phone number or the like)) and charging credentials for settlement upon usage of one or more services.

As such, example tenant entities 102A-102N may span across various types of businesses and industries, and may consume one or more resources/services 110A-Z including, without limitation, cloud storage resources, processor compute resources, network bandwidth resources, load balancing services, virtualized network infrastructure resources, Software as a Service (SaaS) services, Platform as a Service (PaaS) services, Infrastructure as a Service (IaaS) services, streaming media services, voice telephony/VoIP services, and one or more inline services such as, e.g., Deep Packet Inspection (DPI) services, Virus Scanning (VS) services, Intrusion Detection and Prevention (IDP) services, Firewall (FW) filtering services and Network Address Translation (NAT) services, and the like.

Each one of the applications 110A-Z can include a service hosted on the data center 108 and offered to tenants of the data center 108. Each service is represented in the data center 108 via a contract account. The service account is recorded by the TSMS 113 in the blockchain database 130. Each service account specifies the identification of the service. The identification of the service includes a unique identifier that is generated for the service at the time of registration. The service has a unique pair of cryptographic private and public keys defined based on an asymmetric cryptographic scheme. The service account may further specify a name for the service (e.g., a name in a human readable format), charging credentials for settlement upon usage of one or more services by the service, and contact information for one or more persons (e.g., the owner of the service, the administrator of the service, etc.). In some embodiments, the service can be identified with its cryptographic public key in some applications and with another identifier in other applications. For example, the cryptographic public key of the service can be used to identify the service within the blockchain database 130. In another example, a name of the service defined based on a top-level naming scheme that is different from the cryptographic public key of the service can be used to uniquely identify the service for usage tracking and billing. Each one of the services 110A-Z includes a service manager SM that is operative to communicate with a TSMS 113A-L for performing administrative tasks related to the management of the service. For example, the SM is operative to register the service, and handle tenant enrollment and tenant login. Broadly, with a multitenant architecture, the data center 108 may be arranged to provide every tenant a dedicated or configurable share of a resource/service including its data, configuration, user management, tenant individual functionality as well as properties such as security, charging, etc.

The data center 108 further includes a blockchain platform API 121, one or more servers 122A-122M, a distributed memory system 140, and an optional long-term storage 119. Each of the servers 122A-M includes a respective runtime environments 123A-M, a consensus unit 128A-M, a block definer 127A-M, a data access manager 129A-M, and a local storage 126A. The runtime environments 123A-M can be operating systems running on commercial off-the-shelf (COTS) hardware. In some embodiments, when the server runs a virtualized environment, each one of the runtime environment 123A-M may include one or more virtual machines 124A-M for executing code.

The distributed memory system 140 includes a set of local storages 124A-M, where each one of these local storage is included or coupled with a respective server 122A-M. The distributed memory system 140 further includes a blockchain database 130 that is stored either on a centralized storage (which can be one of the local storage media 126A-M) or distributed over multiple storage media. In some embodiments, the blockchain database 130 is stored over multiple storage media in the servers 122A-M, where different blocks forming the blockchain database are stored on different servers. In some embodiments, multiple copies of a block (and consequently of the blockchain database 130) can be stored in one or more additional servers to enable availability of the data in case of server failure.

The data center 108 includes elements of a blockchain system that allow the client applications 112A-L and/or 110A-Z to build, run, and deploy a blockchain based applications (i.e., distributed ledger). While the embodiments below will be described with an exemplary application (TSMS), the data center 108 can have multiple blockchains serviced by multiple blockchain systems for different types of applications. For example, one blockchain may provide tenant management for the underlying cloud computing service. Another blockchain may supply third party service providers, such as streaming media service providers, with customer account management service. In another example, a blockchain may be under use for a production phase while another is being phased into deployment phase.

The data center 108 may implement a plurality of elements of the blockchain system as a distributed system. The data center 108 includes an optional blockchain platform application programming interface (API) 121 that enables the application(s) 110A-Z and/or the applications 113A-L to communicate with one or more elements of a blockchain platform. The data center 108 implements transaction processing elements of the blockchain platform as dynamic and distributed elements that run on a FaaS platform. In these embodiments, instances of one or more functions of the blockchain platform that participate in a transaction processing mechanism are executed on one or more runtime environment upon demand. A transaction-processing element typically handles interaction between the blockchain system to which it belongs and client application(s). For example, the transaction-processing element may enforce certain format restrictions on the client interactions, or if the blockchain system supports smart contracts, the transaction-processing element may run the language runtime system for the smart contract programming language. In the embodiments described herein instead of having a single process implementing the transaction processing element of the blockchain platform running a single server, one or more servers of the data center 108 may include a runtime environment operative to run functions of the blockchain processing system as a distributed architecture.

The data center 108 further includes a set of consensus units 128A-128M. Each of the consensus units is operative to manage the data structures in the blockchain database 130 and to conduct consensus with other consensus units before including any blocks to the blockchain database.

While the embodiments herein will be described with blockchain platforms based on smart contracts, in other embodiments, the blockchain platform can be based on other types of accounts and operations. The operations/functions can be any operations to be performed by a transaction processing element of a blockchain platform that can result in the generation of a transaction that is to be added to a block of the blockchain database.

In operation, the first server 122A receives, at operation 1, a call to a function to be performed for a smart contract of a blockchain database. In some embodiments, the function to be performed is one of creating the smart contract or performing a transaction operation on the smart contract that was previously created. For example, the smart contract can represent a delegation of rights from a service hosted in the data center 108 to a tenant 102A. In other embodiments, the operations can be any operation that may result in a blockchain transaction or a block that is to be recorded in the blockchain database 130.

At operation 2, the call for the function is dispatched to first runtime environment 123A of the first server. When the server includes a virtualized environment, the call for the function can be dispatched to a first virtual machine 124A. In some embodiments, the virtual machine can be one of many virtual machines running on the blockchain database. For example, the virtual machine can be an Ethereum virtual machine (EVM). In some implementations, the function can be a Solidity function. The first runtime environment 123A fetches code from the blockchain database 130, where the code includes a set of one or more instructions to be executed for implementing the function. For example, when the function is an operation to be performed on an existing contract, the contract stored in the blockchain database is accessed to retrieve the code for executing the functions. Exemplary functions can be an update to the contract, such as marking the contract as suspended, deleted, or an update to the participant to the contract. For example, when the contract is set for a tenant and a set of one or more services hosted in the data center 108, the update to the contract can include adding a new service for which the tenant has enrolled. The update can also be a modification to service offers agreed upon by the tenant, or any other types of update of the smart contract.

At operation 4, the code for the function 125A is executed the code in the first runtime environment resulting in a first blockchain transaction and a modified state of the blockchain database. In some embodiments, only a blockchain transaction results from the execution of the code without obtaining an explicit modified state of the blockchain database. In these embodiments, the resulting blockchain transaction may be indicative of modification to a state of the blockchain database. In some embodiments, the execution of the function may not result in a transaction that is to be recorded.

At operation 5, a copy of the blockchain transaction of the blockchain database is stored in a storage medium (e.g., local storage 126A). In some embodiments, the modified state of the blockchain database or a representation of the modified state can also be stored along with the first blockchain transaction in the storage medium. The storage medium is locally accessible by the first server. For example, the storage medium is part of a distributed cluster of storage media accessible to a plurality of servers of the data center. In some embodiments, the data access manager 129A is operative to perform the copy of the blockchain transaction.

At operation 6, the blockchain transaction is added to a first block. The first blockchain transaction is used by the block definer 127A to be added to the first block. The block definer 127A may perform a block finalization operation, which may include one or more of a validation of the first blockchain transaction, validation of the modified state of the blockchain database, a validation of Ommer blocks, application of rewards, etc. In some embodiments, adding the first blockchain transaction to the first block may include adding the transaction to a Merkle tree and calculating one or more Merkle roots to be added to the first block.

At operation 7, a determination of whether the first block is to be added to the blockchain database is performed based on a consensus mechanism. The consensus mechanism is a collaborative process that is performed between the multiple consensus units 128A-M to determine whether the block generated at the server 122A as a result of the call to the function (operation 1) is to be added to the blockchain database. The consensus mechanism is performed for determining a block from a set of multiple blocks that is to be written to the blockchain database. The set of blocks includes the first block and each block from the set of blocks results from execution of code of one or more functions on one or more runtime environments of servers of the data center 108. For example, the data center may include several runtime environments 123B-M that are also operative to receive instructions for executing a blockchain function that results in a transaction to be added to the blockchain database. These transactions added to blocks are subject to the consensus mechanism prior to being committed and added to the blockchain database as immutable records. In some embodiments, a RAFT consensus mechanism as described in "In Search of an Understandable Consensus Algorithm", D. Ongaro and J Osterhaut, Proceedings of USENIX ATC '14: 2014 USENIX Annual Technical Conference, June 2014, pp. 305-319, can be used, in other embodiments other types of consensus algorithms can be used.

Responsive to determining that the first block is to be added to the blockchain database 130, the first block is caused to be stored in a persistent storage as part of the blockchain database. In some embodiments, if the distributed memory system includes nonvolatile memory (NVM), the first block is added and stored in the NVM of the distributed memory system 140 as part of the blockchain database 130. In other embodiments, the storing of the first block can involve periodically flushing the blockchain database 130 into a persistent storage system 119 (e.g., solid state disk (SSD)). At this operation, the block becomes an immutable part of the blockchain record 130. In some embodiments, multiple copies of the block are stored in multiple local storage media of the data center. For example, a first copy of the block is stored in local storage 126A, a second copy is stored in 126B and a third local storage is stored in the local storage 126M. In the case of a server failure copies of the first block stored in other servers (other local storages) preserve the data ensuring high availability of the first block. In some embodiments, each block has a master server and zero or more replica servers that store a copy of it. Access to the first block to the applications (by calls to the functions) is performed through a master server to ensure data consistency. Further the multiple copies of the first block are used by the data access manager (e.g., 129A-129M) to recover the data in the case of a server loss.

The embodiments of the present invention greatly improve the performance of the transaction processing element in a blockchain system. Transactions can be committed to the blockchain database very efficiently. As opposed to prior blockchain platforms, no heavy single transaction processing element process is executed on a server as it is the case in, instead a function is executed dynamically in the runtime environment when needed resulting in a transaction to be recorded in a blockchain database. As a result, in some embodiments, the blockchain transactions are likely to commit to the blockchain database in less than a millisecond. In addition, the embodiments of the present invention improve the capacity of the system to perform transactions. For example, separate and unrelated invocations of a function can be executed in parallel. Several instances of a function can be executed in one or more runtime environment over one or multiple servers of the data center. The execution capacity in the blockchain system is limited only by the number of servers dedicated to the FaaS runtime environment. The availability and resiliency of the service offered by the blockchain system is improved as there is no interruptions due to a server hosting the transaction processing element going offline.

Figure 2:
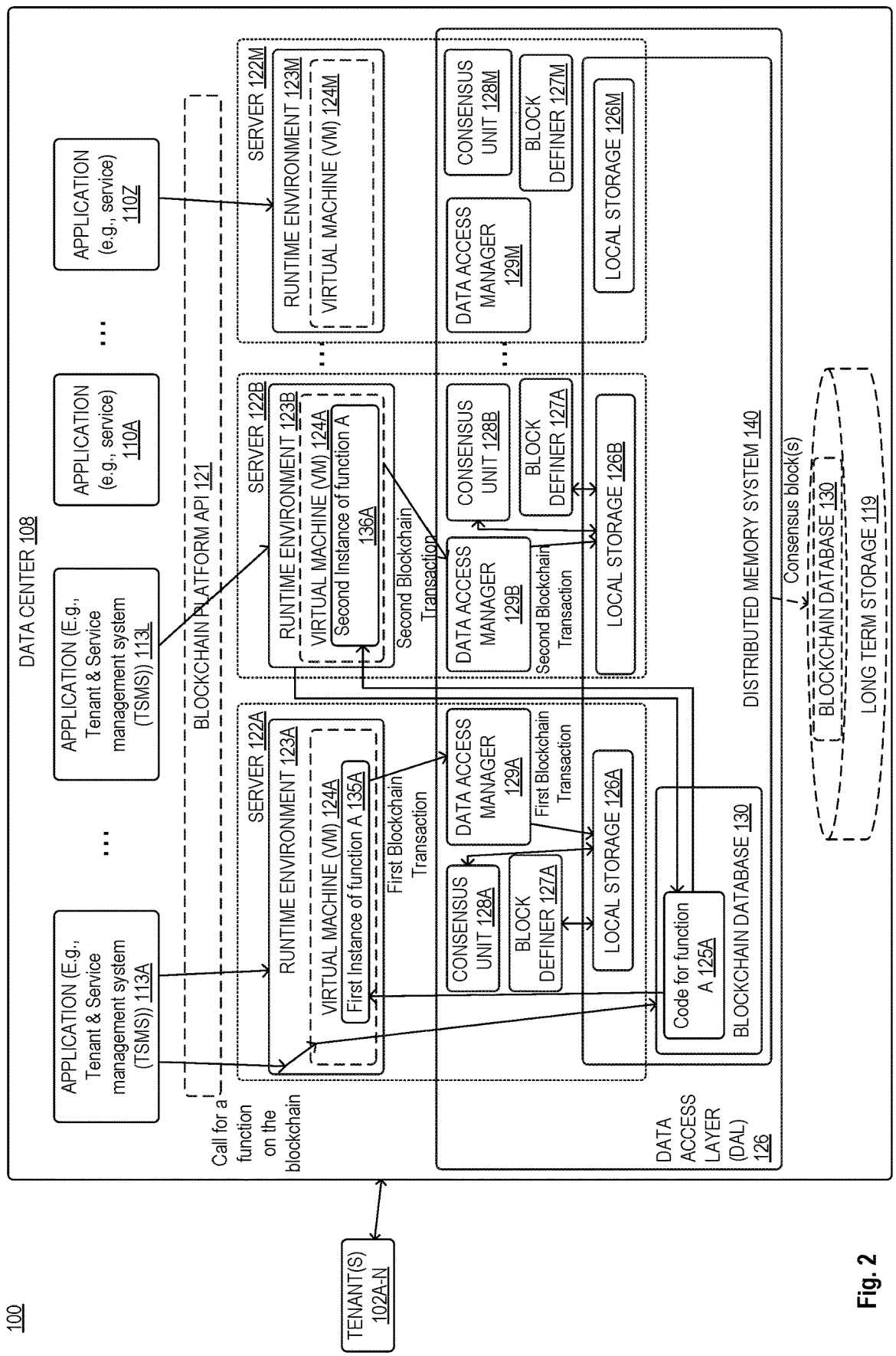
FIG. 2 illustrates a block diagram of an exemplary cloud computing system in which a distributed transaction processing element of a blockchain system enables parallel execution of a function, in accordance with some embodiments.

FIG. 2 illustrates a block diagram of an exemplary cloud computing system in which a distributed transaction processing element of a blockchain system enables parallel execution of a function, in accordance with some embodiments. As illustrated in FIG. 2, based on the present architecture code of a first blockchain function 125A (e.g., an operation on a smart contract stored in the blockchain database 130) can be fetched and an instance of the function can be executed on multiple runtime environment on different servers. For example, a first instance of the first function 135A is executed on the first runtime environment 123A of server 122A in parallel to the execution of the second instance of the first function 136A in the runtime environment 123B of the server 122B. The parallel execution of these functions greatly improves the capacity of the system to perform transactions in a blockchain platform. Once the first instance and the second instance are executed in parallel, the consensus is run which may result in one or more consensus blocks stores. The consensus blocks may include the first blockchain transaction only, the second blockchain transaction only or both the first and the second blockchain transaction.

Figure 3:
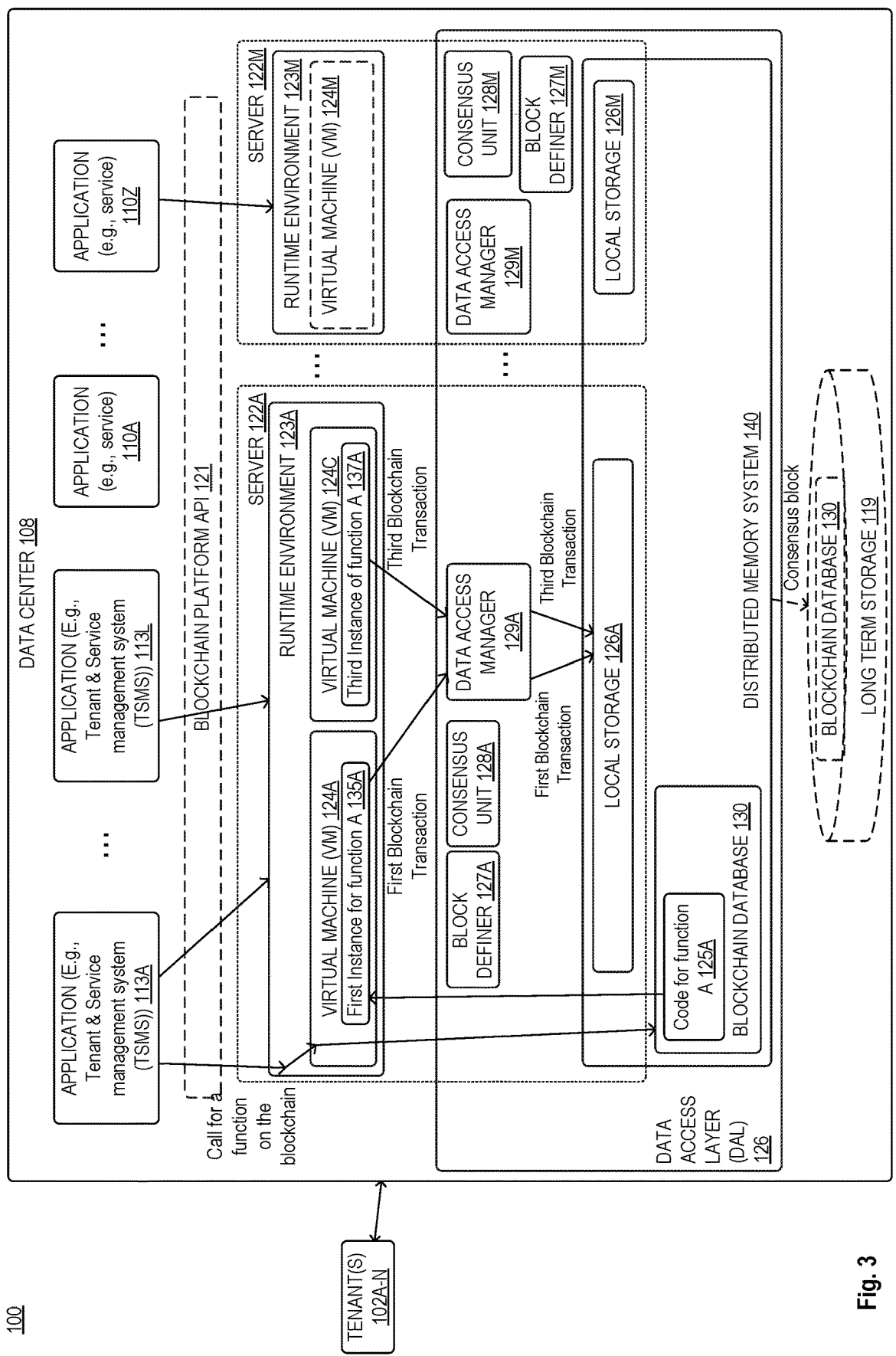
FIG. 3 illustrates a block diagram of an exemplary cloud computing system in which a distributed transaction processing element of a blockchain system enables parallel execution of a function in two different virtual machines running on a single runtime environment of a server, in accordance with some embodiments.

FIG. 3 illustrates a block diagram of an exemplary cloud computing system in which a distributed transaction processing element of a blockchain system enables parallel execution of a function in two different virtual machines running on a single runtime environment of a server, in accordance with some embodiments. As illustrated in FIG. 3, based on the present architecture code of a first blockchain function 125A (e.g., an operation on a smart contract stored in the blockchain database 130) can be fetched and an instance of the function can be executed on multiple virtual machines running in a single runtime environment of a single server. For example, a first instance of the first function 135A is executed on the first virtual machine 124A of server 122A in parallel to the execution of the third instance of the first function 137A in the second virtual machine 124C of the server 122A. The parallel execution of these functions greatly improves the capacity of the system to perform transactions in a blockchain platform. Once the first instance and the third instance are executed in parallel, the consensus is run which may result in one or more consensus blocks stores. Each one of the consensus blocks may include the first blockchain transaction only, the third blockchain transaction only or both the first and the third blockchain transaction.

Figure 4:
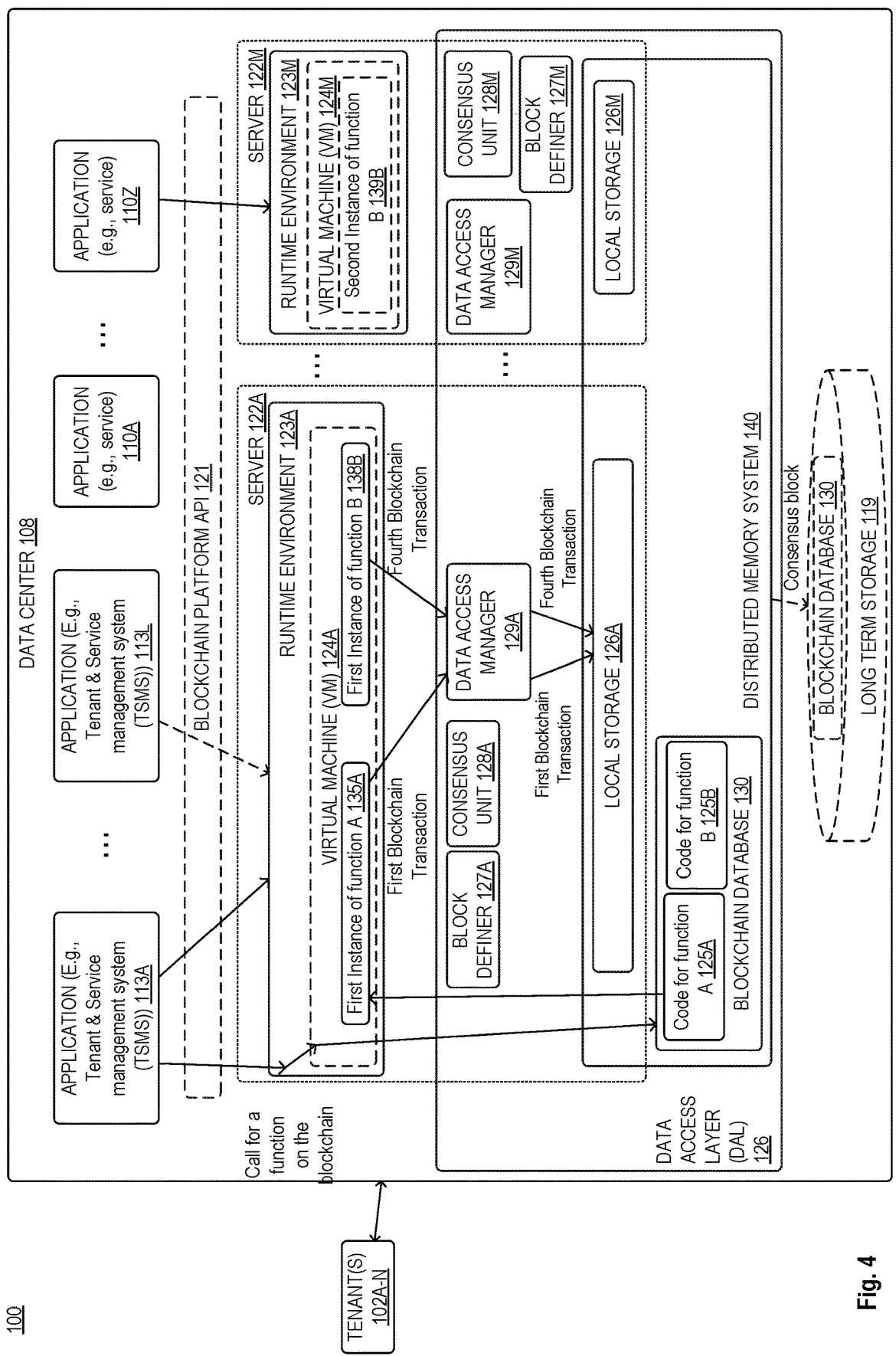
FIG. 4 illustrates a block diagram of an exemplary cloud computing system in which a distributed transaction processing element of a blockchain system enables parallel execution of two different functions in a single runtime environment of a server, in accordance with some embodiments.

FIG. 4 illustrates a block diagram of an exemplary cloud computing system in which a distributed transaction processing element of a blockchain system enables parallel execution of two different functions in a single runtime environment of a server, in accordance with some embodiments. As illustrated in FIG. 4, based on the present architecture code of a first blockchain function 125A (e.g., an operation on a smart contract stored in the blockchain database 130) can be fetched and an instance of the function can be executed a first runtime environment 123A of server 122A and a code of a second blockchain function 125B (e.g., an operation on a smart contract stored in the blockchain database 130) can be fetched and an instance of the function can be executed the same first runtime environment 123A of server 122A. The first instance of the first function 135A is executed in parallel to the execution of the first instance of the first the second function 138B on the first runtime environment 123A of server 122A. This may further be executed in parallel to an instance of the second function 139B that is executed in another runtime environment 123M of the server 122M. The parallel execution of these functions greatly improves the capacity of the system to perform transactions in a blockchain platform. Once these instances are executed in parallel, the consensus is run which may result in one or more consensus blocks stores. Each one of the consensus blocks may include the first blockchain transaction only, the fourth blockchain transaction only or both the first and the fourth blockchain transaction.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 5:
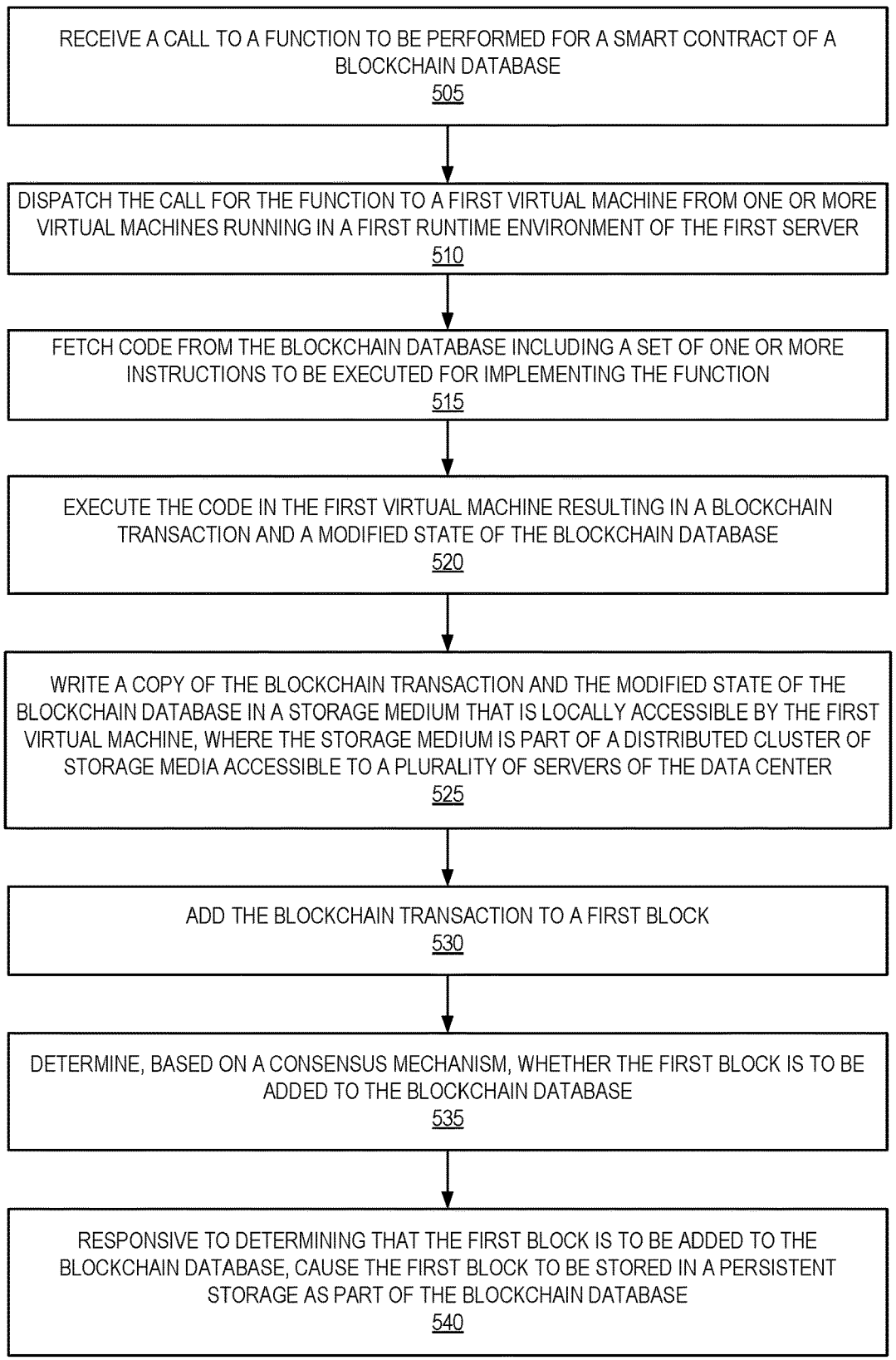
FIG. 5 a flow diagram of exemplary operations performed for implementing a distributed blockchain transaction processing element in a data center, in accordance with some embodiments.

FIG. 5 a flow diagram of exemplary operations performed for implementing a distributed blockchain transaction processing element in a data center, in accordance with some embodiments. At operation 505, the first server 122A receives a call to a function to be performed for a smart contract of a blockchain database. In some embodiments, the function to be performed is one of creating the smart contract or performing a transaction operation on the smart contract that was previously created. For example, the smart contract can represent a delegation of rights from a service hosted in the data center 108 to a tenant 102A. In other embodiments, the operations can be any operation that may result in a blockchain transaction or a block that is to be recorded in the blockchain database 130.

At operation 510, the call for the function is dispatched to first runtime environment 123A of the first server. When the server includes a virtualized environment, the call for the function can be dispatched to a first virtual machine 124A. In some embodiments, the virtual machine can be one of many virtual machines running on the blockchain database. For example, the virtual machine can be an Ethereum virtual machine (EVM). In some implementations, the function can be a Solidity function. The first runtime environment 123A fetches code from the blockchain database 130, where the code includes a set of one or more instructions to be executed for implementing the function. For example, when the function is an operation to be performed on an existing contract, the contract stored in the blockchain database is accessed to retrieve the code for executing the functions. Exemplary functions can be an update to the contract, such as marking the contract as suspended, deleted, or an update to the participant to the contract. For example, when the contract is set for a tenant and a set of one or more services hosted in the data center 108, the update to the contract can include adding a new service for which the tenant has enrolled. The update can also be a modification to service offers agreed upon by the tenant, or any other types of update of the smart contract.

At operation 520, the code for the function 125A is executed the code in the first runtime environment resulting in a first blockchain transaction and a modified state of the blockchain database. In some embodiments, only a blockchain transaction results from the execution of the code without obtaining an explicit modified state of the blockchain database. In these embodiments, the resulting blockchain transaction may be indicative of modification to a state of the blockchain database. In some embodiments, the execution of the function may not result in a transaction that is to be recorded.

At operation 525, a copy of the blockchain transaction of the blockchain database is stored in a storage medium (e.g., local storage 126A). In some embodiments, the modified state of the blockchain database or a representation of the modified state can also be stored along with the first blockchain transaction in the storage medium. the storage medium is locally accessible by the first server. For example, the storage medium is part of a distributed cluster of storage media accessible to a plurality of servers of the data center.

At operation 530, the blockchain transaction is added to a first block. The first blockchain transaction is used by the block definer 127A to be added to the first block. The block definer 127A may perform a block finalization operation, which may include one or more of a validation of the first blockchain transaction, validation of the modified state of the blockchain database, a validation of Ommer blocks, application of rewards, etc. In some embodiments, adding the first blockchain transaction to the first block may include adding the transaction to a Merkle tree and calculating one or more Merkle roots to be added to the first block.

At operation 535, a determination of whether the first block is to be added to the blockchain database is performed based on a consensus mechanism. The consensus mechanism is a collaborative process that is performed between the multiple consensus units 128A-M to determine whether the block generated at the server 122A as a result of the call to the function (operation 510) is to be added to the blockchain database. The consensus mechanism is performed for determining a block from a set of multiple blocks that is to be written to the blockchain database. The set of blocks includes the first block and each block from the set of blocks results from execution of code of one or more functions on one or more runtime environments of servers of the data center 108. For example, the data center may include several runtime environments 123B-M that are also operative to receive instructions for executing a blockchain function that results in a transaction to be added to the blockchain database. These transactions added to blocks are subject to the consensus mechanism prior to being committed and added to the blockchain database as immutable records. In some embodiments, a RAFT consensus mechanism as described in "In Search of an Understandable Consensus Algorithm", D. Ongaro and J Osterhaut, Proceedings of USENIX ATC '14: 2014 USENIX Annual Technical Conference, June 2014, pp. 305-319, can be used, in other embodiments other types of consensus algorithms can be used.

Responsive to determining that the first block is to be added to the blockchain database 130, the first block is caused to be stored in a persistent storage as part of the blockchain database, at operation 540. In some embodiments, if the distributed memory system includes nonvolatile memory (NVM), the first block is added and stored in the NVM of the distributed memory system 140 as part of the blockchain database 130. In other embodiments, the storing of the first block can involve periodically flushing the blockchain database 130 into a persistent storage system 119 (e.g., solid state disk (SSD)). At this operation, the block becomes an immutable part of the blockchain record 130. In some embodiments, multiple copies of the block are stored in multiple local storage media of the data center. For example, a first copy of the block is stored in local storage 126A, a second copy is stored in 126B and a third local storage is stored in the local storage 126M. In the case of a server failure copies of the first block stored in other servers (other local storages) preserve the data ensuring high availability of the first block. In some embodiments, each block has a master server and zero or more replica servers that store a copy of it. Access to the first block to the applications (by calls to the functions) is performed through a master server to ensure data consistency. Further the multiple copies of the first block are used by the data access manager (e.g., 129A-129M) to recover the data in the case of a server loss.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the system 100 can be implemented on one or more network devices coupled in a network. For example, each of the servers 122A-M are implemented on a ND. Each one of the applications 110A-Z and the applications 113A-L can be implemented on one ND or distributed over multiple NDs. The distributed memory system 140 is implemented on a plurality of network devices coupled in a network. Similarly, the tenants 102A-N may be abstract organization for which access to the service is enabled through the use of one or more network devices to access the resources and services hosted in the data center 108.

Figure 6:
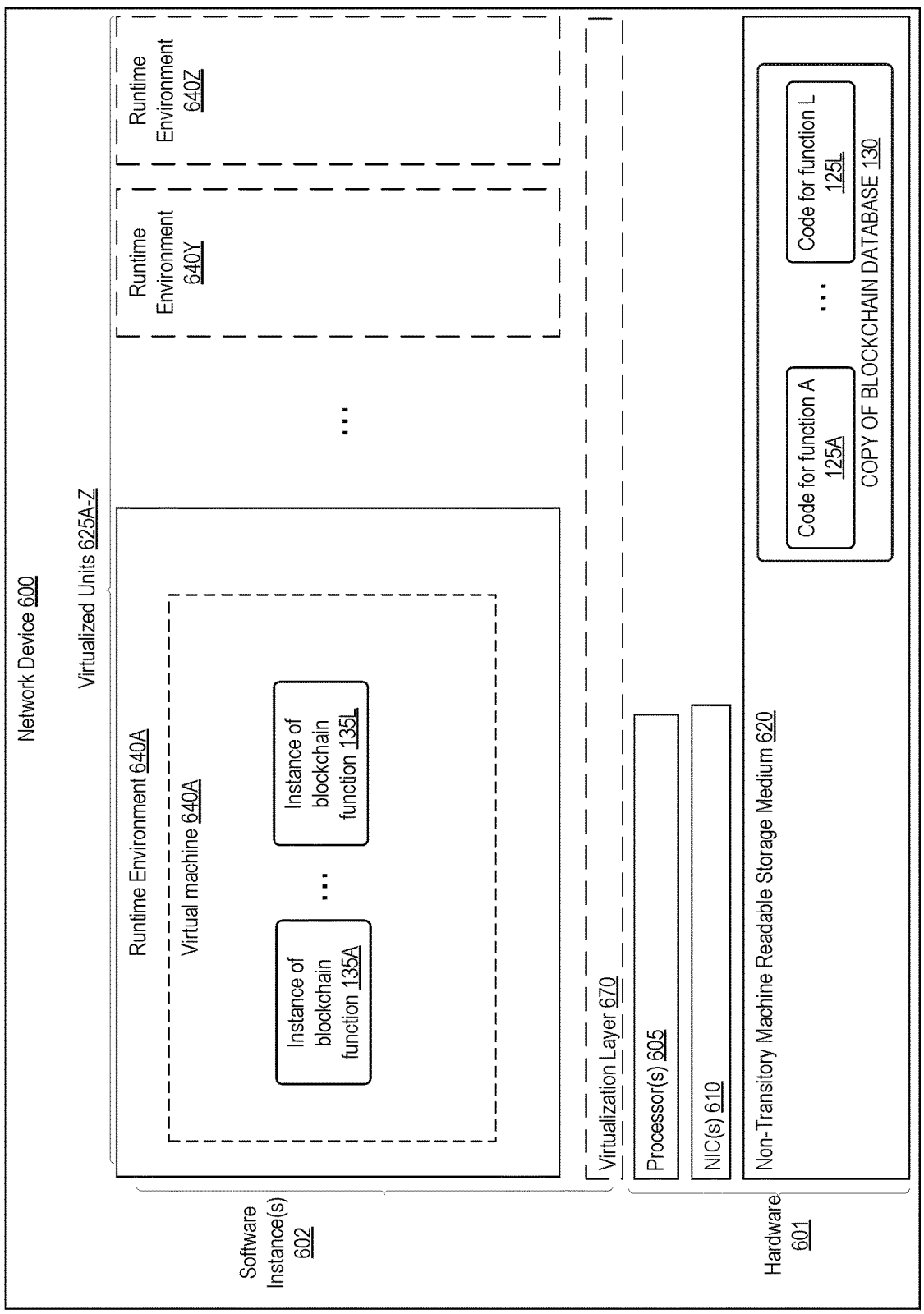
FIG. 6 illustrates a block diagram of an exemplary network device, in accordance with some embodiments.

FIG. 6 illustrates a block diagram for a network device that can be used for implementing one or more of the servers 122A-L described herein, in accordance with some embodiments. According to one embodiment, the network device is a server device which includes server hardware 601. Server hardware 601 includes network communication interfaces 610 coupled with a computer readable storage medium 620. The computer readable storage medium 620 may include a copy of a blockchain database 130 including one or more code for functions 125A-L. When executed the functions enable the implementation of distributed operations of a transaction processing element.

While one embodiment does not implement virtualization, alternative embodiments may use different forms of virtualization. For example, in one such alternative embodiment the virtualization layer 670 represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 670 represents a hypervisor (sometimes referred to as a virtual machine monitor (VMM)) or a hypervisor executing on top of a host operating system, and each of the sets of applications is run on top of a guest operating system within an instance 740A-Z called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 601, directly on a hypervisor (in which case the unikernel is sometimes described as running within a LibOS virtual machine), or in a software container, embodiments can be implemented fully with unikernels running directly on a hypervisor represented by virtualization layer 670, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization if implemented, are collectively referred to as software instance(s) 602. Each set of applications, corresponding virtualization construct if implemented, and that part of the hardware that executes them (be it hardware dedicated to that execution and/or time slices of hardware temporally shared), forms a separate virtual network element(s).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a data center for implementing a blockchain transaction processing component, the method comprising:
   receiving, at a first server of the data center, a call to a function to be performed for a smart contract of a blockchain database;
   dispatching the call for the function to a first runtime environment of the first server;
   fetching code from the blockchain database, wherein the code includes a set of one or more instructions to be executed for implementing the function;
   executing the code in the first runtime environment resulting in a blockchain transaction and a modified state of the blockchain database;
   writing a copy of the blockchain transaction and the modified state of the blockchain database in a storage medium that is locally accessible by the first server, wherein the storage medium is part of a distributed cluster of storage media accessible to a plurality of servers of the data center; and
   in response to writing the copy of the blockchain transaction and the modified state:
      adding the blockchain transaction to a first block;
      determining, based on a consensus mechanism, whether the first block is to be added to the blockchain database; and
      responsive to determining that the first block is to be added to the blockchain database, causing the first block to be stored in a persistent storage as part of the blockchain database.

2. The method of claim 1, wherein the function to be performed includes at least one of creating the smart contract and performing a transaction operation on the smart contract that was previously created.

3. The method of claim 1, wherein the smart contract indicates a delegation of rights from a service hosted in the data center to a tenant of the service for enabling the tenant to access resources from the service based on a service offer agreed upon between the tenant and the service.

4. The method of claim 1, further comprising causing one or more copies of the first block to be stored in one or more storage media in one or more servers separate from the first server to enable high availability of the first block.

5. The method of claim 1, wherein the consensus mechanism is performed for determining a block from a plurality of blocks that is to be written to the blockchain database, wherein the plurality of blocks includes the first block and each block from the plurality of blocks results from execution of code of one or more functions on one or more runtime environments of servers of the data center.

6. The method of claim 5, wherein the consensus mechanism is run across a plurality of servers of the data center.

7. A data center for implementing a blockchain transaction processing component, the data center comprising:
   a first server including:
      a non-transitory computer readable storage medium to store instructions; and
      a processor coupled with the non-transitory computer readable storage medium to process the stored instructions to:
         receive a call to a function to be performed for a smart contract of a blockchain database;
         dispatch the call for the function to a first runtime environment of the first server;
         fetch code from the blockchain database, wherein the code includes a set of one or more instructions to be executed for implementing the function;
         execute the code in the first runtime environment resulting in a blockchain transaction and a modified state of the blockchain database;
         write a copy of the blockchain transaction and the modified state of the blockchain database in a storage medium that is locally accessible by the first server, wherein the storage medium is part of a distributed cluster of storage media accessible to a plurality of servers of the data center; and
         in response to writing the copy of the blockchain transaction and the modified state:
            add the blockchain transaction to a first block;
            determine, based on a consensus mechanism, whether the first block is to be added to the blockchain database; and
            responsive to determining that the first block is to be added to the blockchain database, cause the first block to be stored in a persistent storage as part of the blockchain database.

8. The data center of claim 7, wherein the function to be performed includes at least one of creating the smart contract and performing a transaction operation on the smart contract that was previously created.

9. The data center of claim 7, wherein the smart contract indicates a delegation of rights from a service hosted in the data center to a tenant of the service for enabling the tenant to access resources from the service based on a service offer agreed upon between the tenant and the service.

10. The data center of claim 7, wherein the processor is further to:
cause one or more copies of the first block to be stored in one or more storage media in one or more servers separate from the first server to enable high availability of the first block.

11. The data center of claim 7, wherein the consensus mechanism is performed for determining a block from a plurality of blocks that is to be written to the blockchain database, wherein the plurality of blocks includes the first block and each block from the plurality of blocks results from execution of code of one or more functions on one or more runtime environments of servers of the data center.

12. A non-transitory computer readable medium to store instructions which when executed by one or more processors of a server in a data center causes the one or more processors to perform the following operations:
receiving, at a first server of the data center, a call to a function to be performed for a smart contract of a blockchain database;
dispatching the call for the function to a first runtime environment of the first server;
fetching code from the blockchain database, wherein the code includes a set of one or more instructions to be executed for implementing the function;
executing the code in the first runtime environment resulting in a blockchain transaction and a modified state of the blockchain database;
writing a copy of the blockchain transaction and the modified state of the blockchain database in a storage medium that is locally accessible by the first server, wherein the storage medium is part of a distributed cluster of storage media accessible to a plurality of servers of the data center; and
in response to writing the copy of the blockchain transaction and the modified state:
adding the blockchain transaction to a first block;
determining, based on a consensus mechanism, whether the first block is to be added to the blockchain database; and
responsive to determining that the first block is to be added to the blockchain database, causing the first block to be stored in a persistent storage as part of the blockchain database.

13. The non-transitory computer readable medium of claim 12, wherein the function to be performed includes at least one of creating the smart contract and performing a transaction operation on the smart contract that was previously created.

14. The non-transitory computer readable medium of claim 12, wherein the smart contract indicates a delegation of rights from a service hosted in the data center to a tenant of the service for enabling the tenant to access resources from the service based on a service offer agreed upon between the tenant and the service.

15. The non-transitory computer readable medium of claim 12, further comprising causing one or more copies of the first block to be stored in one or more storage media in one or more servers separate from the first server to enable high availability of the first block.

16. The non-transitory computer readable medium of claim 12, wherein the consensus mechanism is performed for determining a block from a plurality of blocks that is to be written to the blockchain database, wherein the plurality of blocks includes the first block and each block from the plurality of blocks results from execution of code of one or more functions on one or more runtime environments of servers of the data center.

17. The non-transitory computer readable medium of claim 16, wherein the consensus mechanism is run across a plurality of servers of the data center.

* * * * *